United States Patent [19]

Pugh

[11] 3,721,002
[45] March 20, 1973

[54] HIGH VOLTAGE CABLE SPLICING AND TERMINATING METHODS

[76] Inventor: Paul F. Pugh, 4082 Sequoyah Road, Oakland, Calif. 94605

[22] Filed: May 15, 1970

[21] Appl. No.: 37,570

[52] U.S. Cl. ..........................29/628, 174/8, 174/10, 174/11, 174/15
[51] Int. Cl. ...............................................H01r 43/00
[58] Field of Search...29/628, 630 A, 630 R; 174/11, 174/15, 20, 21, 8, 10

[56] References Cited

UNITED STATES PATENTS

| 3,441,658 | 4/1969 | Stark | 29/628 |
| 3,515,794 | 6/1970 | Beinhaur | 29/628 |
| 3,519,729 | 7/1970 | La Van | 29/628 |
| 3,520,986 | 7/1970 | Krup | 29/628 |
| 1,919,935 | 7/1933 | Eby | 174/20 |
| 2,049,835 | 8/1936 | Emanueli | 174/21 |
| 2,791,622 | 5/1957 | Nicholas | 174/20 |
| 3,209,067 | 9/1965 | Channell et al. | 174/11 R |
| 3,321,568 | 5/1967 | Venturelli | 174/20 |
| 3,608,710 | 9/1971 | Pugh | 174/21 |
| 3,613,231 | 9/1971 | Pugh | 174/8 |

Primary Examiner—Richard J. Herbst
Assistant Examiner—James W. Davie

[57] ABSTRACT

The circulation of a fluid through the center of a high voltage cable can be used to monitor the cable temperature and to increase the loading limit of the cable. The methods for terminating and splicing fluid-filled power cables with fluid circulation and for controlling the fluid pressure when the cables are terminated in free air are novel and a part of a high voltage cable system.

10 Claims, 4 Drawing Figures

PATENTED MAR 20 1973　　　　3,721,002

HIGH VOLTAGE CABLE SPLICING AND TERMINATING METHODS

BACKGROUND OF THE INVENTION

This invention relates to the method for splicing and terminating a high voltage cable system and a method for manufacturing cable and pothead assembly system. More particularly, the invention relates to an unique method for terminating fluid-filled cables which are provided with fluid circulation to monitor cable temperature, to extract heat from the cable, and to permit additional loading of the cable safely. The termination methods relate to terminations in free air. The termination methods relate to factory assembled and field made terminations. The terminations relate to factory assembled terminations which can be partially disassembled for pulling through conduits or bored holes. The terminations can be joined in the field for ease of splicing cables. In addition, the invention relates to Method Patent applications Ser. No. 777,415 dated Nov. 20, 1968 now U.S. Pat. No. 3,608,710 and Ser. No. 844,954 dated July 25, 1969 now U.S. Pat. No. 3,613,231.

The high cost of underground transmission electric power lines has been due largely to high labor costs for installing and limited loading ability. In particular, this invention relates to new methods for terminating fluid-filled cables in free air so that fluid can be circulated through the termination by way of the hollow conductor to prevent a hotspot and to control high fluid pressures which may develop.

Presently a larger sized cable is spliced to the end of the cable circuit to reduce heating at the termination. This is costly and inconvenient. The new termination methods permit the use of the same size cable when the circuit leaves the ground for connecting to overhead power lines or for connecting to open bus work in substations. The loading of the cable is not limited by the ends of the cable exposed to the sun.

Frequently it is desirable to pull cables through conduits or through holes bored horizontally. Factory assembled potheads (application Ser. No. 777,415) are too large in diameter to fit a conduit. A method for factory attaching a pothead which can be partially disassembled to fit the conduit or hole and permits pulling without damage or loss of cable pressure is a part of this invention.

Presently, all fluid-filled power cables are terminated in the field by specially trained crews which take several days of around-the-clock work for each termination or splice. Installations require proper weather and enclosures. Factory assembled terminations can be assembled in a few minutes by regular line crews under all weather conditions. Considerable time and expense is saved. The factory assembled potheads are performed under controlled environmental conditions. The cable and pothead can be factory tested as a complete unit. Normally, temporary factory terminations are used which must be removed after testing.

SUMMARY OF THIS INVENTION

This invention relates to unique methods for manufacturing, assembling, installing and operating high voltage cable terminations and splices (application Ser. No. 777,415) which can be factory assembled and pulled through a conduit or bored hole. The terminations are factory attached at the factory to a fluid-filled cable. They are partially disassembled to permit pulling through a conduit or a hole in the field.

The factory assembled termination consists of a conventional epoxy molded termination with the stress cone molded into the epoxy wall and an anti-corona cap both of which are submerged in insulating fluid under pressure. The epoxy molded termination is slightly larger than the cable. The anti-corona cap is attached to the termination for performing factory electrical tests. The cap can be removed and a tough plastic shell placed over the epoxy termination to prevent damage during pulling. The plastic shell is removed and the anti-corona cap replaced after pulling. The termination is placed in a metal sleeve and filled with fluid and pressurized similar to application Ser. No. 777,415.

An unique aspect of this invention is a termination that can be made in air and attached to an overhead line on a pole or to open bus in a substation and will permit the cooling of the cable termination through the conductor. The arrangement is such that pressure control is maintained on the epoxy shell in that the pressure is essentially the same on both sides of the shell. The porcelain bushing is under compression which permits circulation of fluid at high pressures safely. These terminations in air may be field assembled or factory assembled. Factory assembled terminations may be made by hand taped stress cones or molded stress cones. The field assembled stress cones may be either hand taped stress cones, preformed stress cones, or molded stress cones.

The factory assembled terminations are factory tested with the cable in the shipping container and shipped to the installation site in a box-type package. (applications Ser. Nos. 777,415 and 844,954)

The internal valve can be opened, if needed, by inserting a long tool through the open external fitting or valve in order to fill the chamber with oil or fluid after assembly. The unit may be mounted on insulators to provide open circuited sheath operation for the cable.

Figure 2:
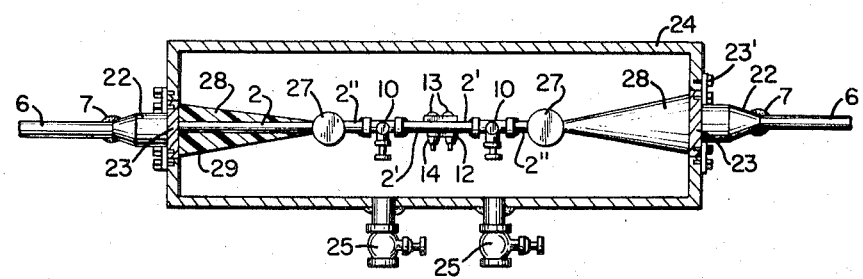

FIG. 2 shows a field assembled splice similar to application Ser. No. 777,415 except the potheads are epoxy molded with anti-corona caps. Shown in section on the left is the molded stress cone in the epoxy. Two small potheads which have been factory assembled to cables are bolted together in the field and enclosed in a metallic tube which is filled with fluid or oil by inserting long tools through open external valves. The fluid is provided from a tank at the cable termination.

Figure 3:
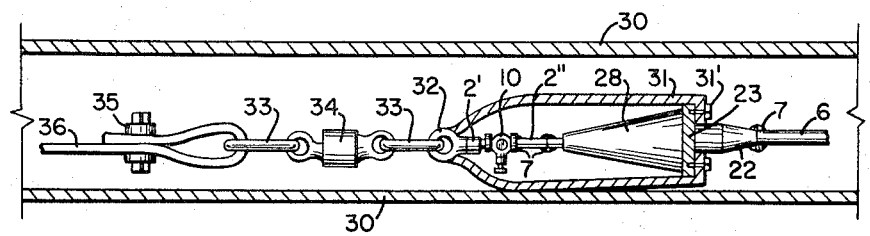

FIG. 3 shows a factory assembled pothead being pulled through a conduit. The anti-corona cap has been removed. A plastic shell has been clamped over the terminal for abrasion protection. A pulling rope on the left is attached to the pothead through a swivel to prevent the cable from twisting.

Figure 1:
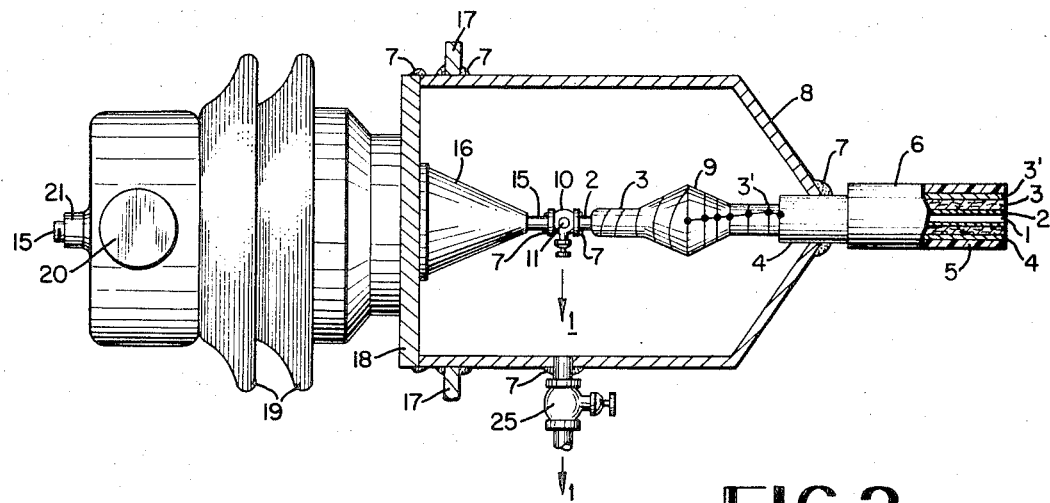
FIG. 1 is a view of the termination for mounting on pole to connect to overhead line or to connect to open bus work. The top of the termination is an apparatus bushing usually mounted on a transformer or switchgear. The bottom portion is cutaway to show the inside of a cylindrical metallic tube which is factory welded to the apparatus bushing supporting plate and factory welded to the cable aluminum sheath. A fitting is welded to the aluminum tube for exit of oil during circulation. Inside the cutaway tube is the cable stress cone, a port, and a valve for controlling oil flow, bolted connection, the bushing stud, and the internal portion of the apparatus bushing without a ground plate. Shown to the right in FIG. 1 is a cutaway side view of the cable showing the hollow core, aluminum conductor, paper insulation, aluminum shielding tape, aluminum sheath, and bonded polyethylene jacket. Oil flows through the hollow core of the cable, through the fittings, and through the external piping to the next cable or hydraulic equipment. The fittings are used to hold pressure and stop flow if needed during assembly and installation. The complete unit is factory assembled and filled with oil or a fluid to a positive pressure after which the external valve is closed.
Figure 4:
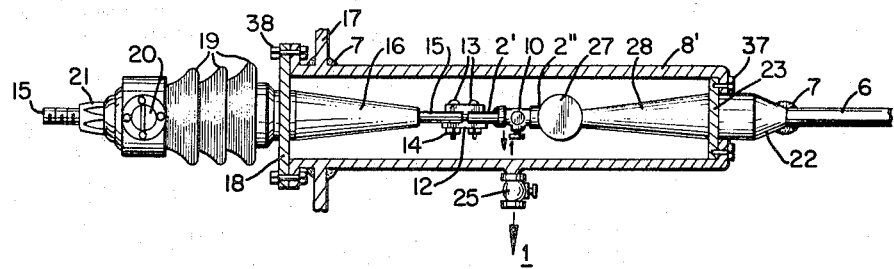

FIG. 4 shows an alternate method of FIG. 1 using a factory attached small pothead. This unit can be field assembled to the outdoor apparatus bushing by bolting the bushing stud to the pothead stud. Fluid is brought into the metal housing after it is bolted into place in a similar fashion as explained for the splice. This unit is particularly useful when one end must be pulled through a conduit or when the size of the outdoor type unit is too large to transport with the cable conveniently.

DESCRIPTION OF THE PREFERRED METHOD

Attention is now directed to the drawings in detail. In FIG. 1 is shown the side view of a fluid-filled self-contained cable 6. Shown is the hollow core aluminum conductor 2 with fluid 1 pressurized or flowing through conductor 2. Paper insulation 3 is surrounding the conductor 2. The paper insulation 3 is impregnated with oil and pressurized with a fluid in the conventional manner for self-contained fluid-filled cable systems. An aluminum sheath 4 surrounds the shield 3'. The outer finish of the cable is a bonded polyethylene jacket 5.

To assemble FIG. 1 the apparatus bushing which was previously manufactured without a ground plate and with components consisting of stud 15, cap 21, gage for oil level 20, outdoor porcelain bushing 19, mounting plate 18, and internal porcelain bushing 16 which is welded 7 at top and bottom of housing 8 after connection 10 is made to conductor 2. The metal housing 8 was first slid down over the cable. A conventional stress cone 9 was hand taped to the cable after the aluminum sheath was removed the proper distance in the conventional manner. A welded connection 7 is made from the hollow conductor 2 to fitting 10. The fitting 10 is also welded 7 to stud 15 of bushing. Stud 15 is copper or aluminum. Next, the metal housing 8 is moved into position and welded 7 to cable aluminum sheath 4 and bushing plate 18. Fitting 10 is opened by inserting a long tool through valve 25 which is opened to permit filling the housing with a fluid and pressurizing. The cable 6 and terminal is factory tested as a unit. For shipping and installation the unit is placed in shipping container and removed (application Ser. No. 777,415) for attachment to a pole in air by brackets 17 which were welded 7 to housing 8. The unit may be mounted on insulators for open circuited sheath operation.

FIG. 2 is an another method for field jointing of cable 6 which was described fully in application Ser. No. 777,415. Previously, factory attached potheads consisting of base 22; plate 23; molded epoxy 28; stress cone 29; anti-corona cap 27; and welded 7 connection to fitting 2'', fitting 10, and copper tube 2' were factory assembled. The two potheads are attached by first sliding sleeve 24 over cable 6 to right to permit bolting together copper tubes 2' with fitting 12 which has bolts 13 and nuts 14. The sleeve 24 is then slid into place and field bolted 23' at both ends. Fittings 25 are lined up so that a tool can be inserted through open fittings 25 to permit open fittings 10 in order to fill housing with fluid 1 from a tank located at other termination of cable 6. Fluid 1 can be passed through the splice by the hollow core 2. Fluid 1 may enter or leave splice through fittings 25. The completed splice can be buried or placed in a box. A ground connection can be made to splice or the splice can be isolated from ground by insulating materials. The entire splice can be coated with somastic or bitumen materials for corrosion protection.

FIG. 3 shows a factory assembled cable 6 and epoxy pothead 28 being pulled through a conduit 30. The epoxy pothead 28 was assembled as described for FIG. 2 except the anti-corona cap 27 was left off for installation later. A pulling eye 32 with a plastic shell 31 is attached to the pothead plate 23 with screws 31'. Rings 33, swivel 34, and pulling rope 36 with bolts 35 are attached to pothead by eye 32 for pulling the factory assembled pothead and cable through a conduit 30.

FIG. 4 shows an alternate method of FIG. 1 for connecting the factory assembled cable 6 and pothead 28 to an overhead line in the field to permit fluid circulation through the pothead and to maintain pressure control on the pothead 28. The epoxy pothead 28 was factory assembled as described in FIG. 2. An apparatus bushing as described in FIG. 1 is previously manufactured and is shipped to the field. After the cable 6 is installed with pothead 28, the termination is field assembled as follows. The metal housing 8' is lowered over cable 6. Tube 2' and stud 15 are bolted together with fitting 12, bolts 13, and nuts 14. The sleeve 8' is slid into position and fastened at the bottom with a screw 37 and the top is fastened with bolts 38 to the bushing plate 18.

Fitting 10 was aligned with fitting 25 so that valve 10 can be operated by inserting a long tool through valve 25 when open. The fluid 1 is then let into housing 8'. Fitting 25 is closed after housing 8' is filled with fluid 1 and pressurized. The terminal is attached to pole by support 17. An electrical connection is made from stud 15 to overhead line or open bus.

The new methods for assembly and installation of insulated cable systems relate to manufacturing of the pothead; pressurizing of the fluid, forced cooling of the cable, splices, and terminations; splicing of the cable; terminating of the cable; the testing of cable and potheads; and the pulling of factory assembled potheads through a conduit or hole.

Many types of materials have been shown, however, it is within the contemplated scope of this invention that numerous changes and techniques disclosed herein without departing from the intended scope of this invention. Molded, laminated, natural, or synthetic potheads with or without built-in stress cones may be applied to cables in the factory and used for field installation of fluid-filled and pressurized cable systems all of which are within the scope of this invention.

I claim:
1. A method for terminating a pressurized fluid-filled hollow conductor insulated cable comprising the steps of
   a. forming said cable to desired position and removing the sheath, the shield, and the insulation of said cable for proper dimensions;
   b. attaching a valve electrically to the end of said hollow conductor;
   c. positioning a metallic compartment with fittings about the end of said cable;
   d. building a stress cone on the end of said shield of said cable;
   e. attaching a metallic rod electrically to said valve;
   f. positioning an insulating material on said rod and sealing to said rod;
   g. moving said metallic container into position and sealing to said cable sheath and said insulating material;
   h. purifying said compartment and filling said compartment with an insulating pressurized fluid; and
   i. electrically connecting said rod of said termination to electrical equipment.

2. A method according to claim 1 wherein said insulating material over said metallic rod is an apparatus bushing and said step of connecting said bushing to said metallic compartment includes bolting the compartment to the bushing.

3. A method according to claim 1 wherein said pressurized fluid is removed from said metallic compartment and said hollow conductor of said cable to measure the quality of said fluid, to determine the temperature of said fluid, and to cool said fluid.

4. A method for making a cable with factory-built potheads with a pressurized fluid-filled hollow conductor insulated cable comprising the steps of
   a. removing the cable ends from the shipping container at the factory or a distance from the installation site, positioning said cable ends, removing the sheath, removing the shield, and removing the insulation from both ends of said cable for proper dimensions;
   b. positioning small potheads with molded stress cones of natural or synthetic insulating material on said cable ends;
   c. attaching electrically said cable shield to said molded stress cones;
   d. sealing said molded stress cones to said hollow conductor and said sheath of said cable;
   e. attaching electrically valves to the ends of said hollow conductor;
   f. purifying said potheads and filling said potheads with an insulating pressurized fluid;
   g. attaching a pulling eye to said valve to the first said pothead;
   h. positioning a protective shield over said valve and said pothead;
   i. attaching said protective shield to said pulling eye; and
   j. mounting said potheads in said shipping container and shipping to said installation site.

5. A method according to claim 4 wherein said potheads are molded from an epoxy material and are sealed to said cable sheath and said hollow conductor with a structural cement.

6. A method for jointing insulated cables with factory attached potheads in a conduit system comprising the steps of
   a. inserting a pulling rope through said conduit;
   b. positioning a shipping container with said cable and said factory attached potheads next to said conduit;
   c. removing first said pothead and attaching said pulling rope to the factory attaching pulling eye;
   d. pulling said pothead and said cable from said shipping container with said pulling rope through said conduit;
   e. removing said pulling rope, said pulling eye, and said protective covering from said pothead;
   f. removing second said pothead from said shipping container; and
   g. electrically connecting said potheads to electrical conductors in a compartment filled with an insulating and pressurized fluid.

7. A method according to claim 4 wherein said conductor is a hollow aluminum tube pressurized with said fluid and said cable sheath is a loose-fit non-metallic rubber-like flexible pipe which is sealed to said pothead and said pipe is pressurized with a second fluid.

8. A method according to claim 7 wherein said fluids are removed separately from said hollow conductor and said compartment; and from under said sheath for measuring the quality of said fluids, for determining the temperature of said fluid, and for cooling said fluids.

9. A method according to claim 8 wherein said fluids are are pressurized at different pressures.

10. A method for splicing cables with factory-built molded potheads with pressurized fluid-filled hollow conductor insulated cables comprising the steps of
   a. removing said molded potheads and said cables from their factory shipping containers at the installation site;
   b. installing said cable and said potheads;
   c. positioning two said molded potheads of said cables;
   d. positioning a metallic compartment with fittings over one length of said cable next to said molded pothead;
   e. electrically connecting the two ends of said molded potheads;
   f. positioning said metallic compartment over said molded potheads to line up factory attached valves at said ends of said molded potheads with said fittings on said metallic compartments;
   g. sealing said metallic compartment to said molded potheads;
   h. purifying said metallic compartment through said fittings;
   i. opening said valves on said molded potheads in said metallic compartment by inserting a long tool through said fittings;
   j. filling said metallic compartment with an insulating pressurized fluid; and
   k. sealing, covering, and protecting said metallic compartment and splice.

* * * * *